(No Model.)

E. R. CAHOONE.
BROILER.

No. 582,174. Patented May 11, 1897.

WITNESSES

INVENTOR
Edwin R. Cahoone
By Francis M. Wright,
Atty.

United States Patent Office.

EDWIN R. CAHOONE, OF NEWARK, NEW JERSEY.

BROILER.

SPECIFICATION forming part of Letters Patent No. 582,174, dated May 11, 1897.

Application filed July 3, 1896. Serial No. 598,054. (No model.)

*To all whom it may concern:*

Be it known that I, EDWIN R. CAHOONE, a citizen of the United States, residing at Newark, in the county of Essex and State of New Jersey, have invented certain new and useful Improvements in Broilers and Stove-Fronts Therefor, of which the following is a description.

My invention relates to improvements in broilers and stove-fronts therefor, the object of my invention being to provide a broiler and a novel arrangement of stove-front therefor by which the juices and fat dripping from the meat in the broiler can be removed from the radiated heat of the stove, from the ashes dripping from the stove, and from the gases generated thereby, so as to preserve said drippings from contamination by said ashes and gases, and to avoid the offensive odor and smoke which would be occasioned by the burning of said fat by said radiated heat.

Figure 1:
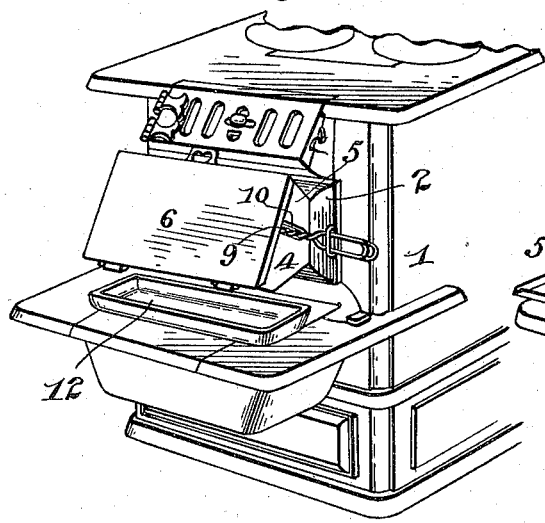
Figure 2:
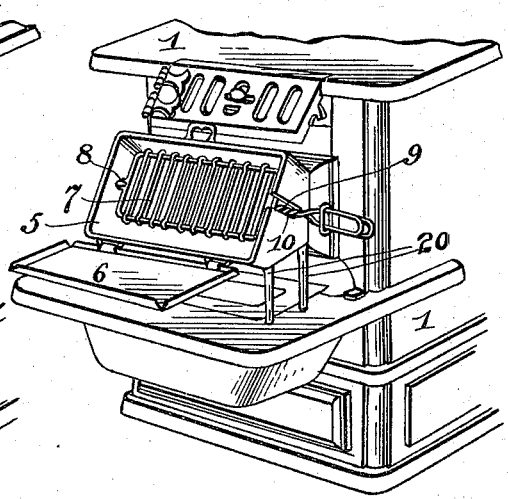
Figure 3:
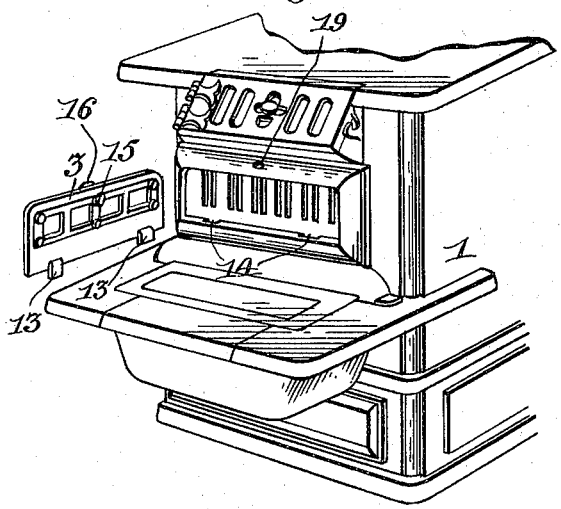
Figure 4:
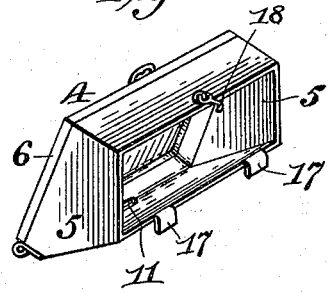
Figure 5:
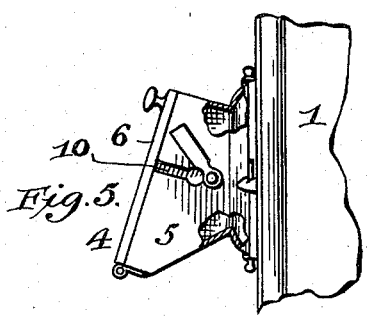

In the accompanying drawings, Figure 1 is a perspective view of the front portion of a stove with my improved broiler in position thereon. Fig. 2 is a similar view showing the drip-pan removed and the broiler open. Fig. 3 is a similar view showing the stove and removable plate, the latter being laid in a position to show the means for holding it upon the stove. Fig. 4 is a perspective view of the broiler detached, and Fig. 5 is a side view of a modification of the invention.

1 represents the stove, 2 the stove-plate, and 3 a removable plate in the stove-front. This plate is made removable to permit of mounting a broiler in the opening in front, as seen in Fig. 1. This broiler (represented by 4) comprises a somewhat hopper-shaped casing 5, provided with a cover 6, hinged to the lower outer edge of the same. The smaller end of this casing is adapted to fit snugly in the aperture in the stove-front which was covered by plate 3. The holder 7 for the steak to be broiled may be of wire in two parts, hinged together so as to embrace the steak. It has a journal 8 at one end to fit in a hole in the end of the casing 5, and another journal 9, which engages an open-slot bearing 10 in the other end of the casing. This journal is prolonged to form the handle of the holder, by which the latter may be rotated in its bearings.

The cover 6 is closed when the broiler is in use. The lower horizontal side or bottom of the casing is slightly depressed or concaved, and it has a hole 11 at its lowest part, through which the juices and fat from the meat flow out and fall into a platter or receptacle 12 set in the hearth of the stove under the casing.

The plate 3 is so mounted in the front of the stove that it may be lifted out and removed, or, if preferred, it may be simply let down, lugs 13 in the lower edge of the plate engaging recesses 14 in the stove-front. It has also a turn-button 15 in its top edge and a handle 16 therefor, whereby it is held in position. The broiler-casing is also provided with lugs 17, adapted to engage the recesses 14, and it has a hook 18 on the upper edge which will slide over and drop into an eye 19 in the upper side of the aperture in the stove-front.

Instead of supporting the broiler-casing at the aperture in the stove-front by means of the lugs 17, engaging the recesses 14, I may also provide legs 20, on which the casing may stand at such a height as to register with said aperture and permit the insertion of a platter, as 6, under the broiler.

It is not essential that the broiler-casing shall be detachable from the stove-front. The said front may be hinged or removable, and said casing may be cast in one piece with it and have a detachable cover of tin-plate, sheet-iron, or the like. This construction is illustrated in Fig. 5, wherein the casing 5 is shown as formed integrally with the front of the stove.

It will appear that the novelty of my invention consists in providing the stove-front with a removable plate so located that the lower edge of the aperture for said plate is elevated a sufficient distance above the lower edge of the stove-front to permit a drip-pan to be placed beneath a broiler inserted in said aperture, and in providing a broiler having a perforated bottom, which permits of the drippings draining through said perforation into a drip-pan placed beneath said broiler. The utility of this construction resides in the fact that such a drip-pan is completely sheltered from the deleterious heat or products of the stove. The lower part of the stove-front shuts off the radiant heat direct from the stove; the drip-pan will be in such a position that ashes cannot fall into it, nor will gases from the stove affect it, and the drip-pan is also sheltered from the heat reflected from the broiler, the only opening being the small aperture through which the drippings run.

Having thus fully described my invention, what I claim is—

1. In combination with a stove having a plate in its front removable therefrom so as to leave an aperture therein whose lower edge is elevated above the lower edge of the stove-front to permit a drip-pan to be placed thereunder, a broiler provided with means for supporting it in register with said aperture, the bottom of said broiler being recessed or concaved as shown and having at its lowest point an outlet for the drippings, substantially as described.

2. In a stove, a front therefor having a broiler-casing opening into said front, and supported thereon at a height such that the bottom of said casing shall be elevated to permit a drip-pan to be placed between said casing and the stove-hearth, said bottom being recessed or concaved as shown and having at its lowest point an outlet for the drippings, substantially as described.

In witness whereof I have hereunto set my hand in the presence of two subscribing witnesses.

EDWIN R. CAHOONE.

Witnesses:
P. M. HOUGH,
FRANCES M. WRIGHT.